Sept. 2, 1958 J. POLATSEK 2,849,730
POWER OPERATED CONVERTIBLE DAVENPORT
Filed Oct. 19, 1954 4 Sheets-Sheet 1

INVENTOR.
JOHN POLATSEK
BY Robb&Robb
attorneys

INVENTOR.
JOHN POLATSEK
BY Robb & Robb
attorneys

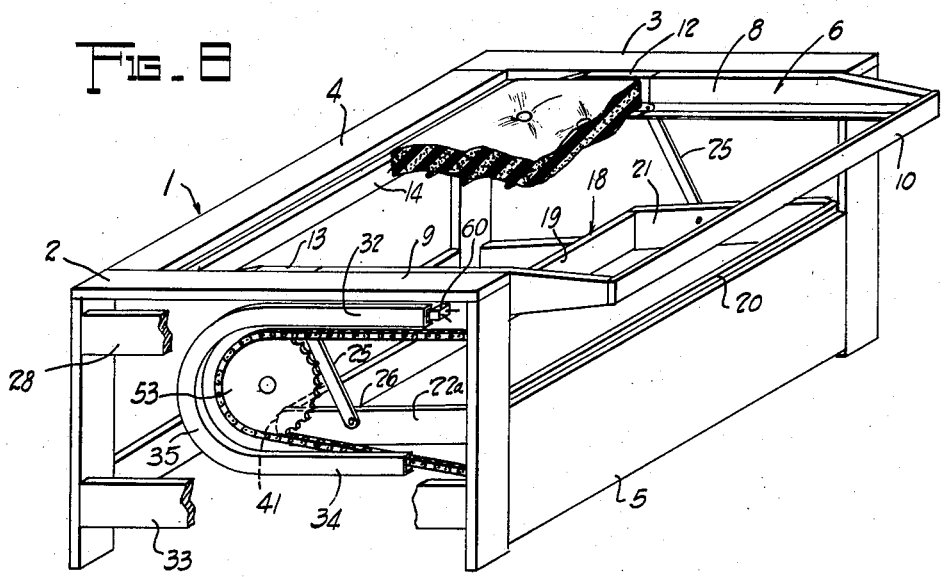

United States Patent Office 2,849,730
Patented Sept. 2, 1958

2,849,730

POWER OPERATED CONVERTIBLE DAVENPORT

John Polatsek, Cleveland Heights, Ohio

Application October 19, 1954, Serial No. 463,123

3 Claims. (Cl. 5—45)

This invention relates to convertible davenport-bed construction and primarily to such a type of construction wherein the operation of the said unit is carried out by power means, eliminating the necessity for manual manipulation of the respective parts of the mechanism.

Heretofore many different types of davenports have been devised which were convertible for use either as a davenport or as a bed, these primarily involving the use of a seat and back member which are interconnected and manipulable by manual exertion to change the respective positions thereof so as to be used either as a davenport or bed. In general these prior devices have involved very complicated mechanisms and strong springs which in many cases required considerable exertion to carry out the conversion, and thereafter require the bed which is formed when the davenport is manipulated be made up and similarly dismantled when no longer required for use.

One of the primary advantages of the present invention is the provision of an article of the type described wherein the bed and bed clothing may be preliminarily assembled or made up so that by a simple operation not requiring further manipulation, the davenport may be converted into a bed and used instantly.

It is therefore a primary object of this invention to provide a convertible davenport-bed which is power operated, whereby the change in position of the respective parts may be effected readily and yet a comfortable bed is provided already made up without the necessity for further effort on the part of the person intending to use the said bed.

Another object of the invention is to provide a novel arrangement of the respective parts wherein the portion of the unit which comprises the bed includes a part which in one position will serve as the back or back rest for the davenport, and in another position provide the necessary support for a mattress and the usual appurtenances therefor to use as a bed.

Another object of the invention is to provide in an article of the class described, an arrangement of the respective back and seat members wherein the seat portion of the davenport is moved by gravity into a position out of its usual location when the power operated means is manipulated to cause the back including the bed provided thereby to move into position for use as a bed.

A further object of the invention is to arrange the respective parts of the apparatus whereby smooth quiet operation is effected, the moving power operated parts, including the back section and its associated portion, may be undertaken and the actual operation of conversion is effected by power means manipulated by simple switch devices.

A further object of the invention is to provide a davenport-bed unit of the class described wherein the operation of converting the bed as set up back into a davenport, is carried out by the power operated means and during such operation, the seat is automatically raised into position and thereafter in conjunction with the back and bed portion provides a comfortable davenport otherwise indistinguishable from the usual davenport.

Other and further objects of the invention will be understood from a consideration of the specification appended herein and shown in the drawings wherein:

Figure 8 is a perspective view, somewhat fragmentary in nature illustrating the relationship of the parts, it being apparent that in the various views the upholstery and mattress parts of the unit have been omitted in most instances.

Figure 9 is a bottom plan view, somewhat fragmentary in nature showing the arrangement of the power drive mechanism in somewhat greater detail.

Figure 10 is a diagrammatic view illustrating the manner of wiring of the respective limit switches and power device for operating the mechanism.

Figure 1:
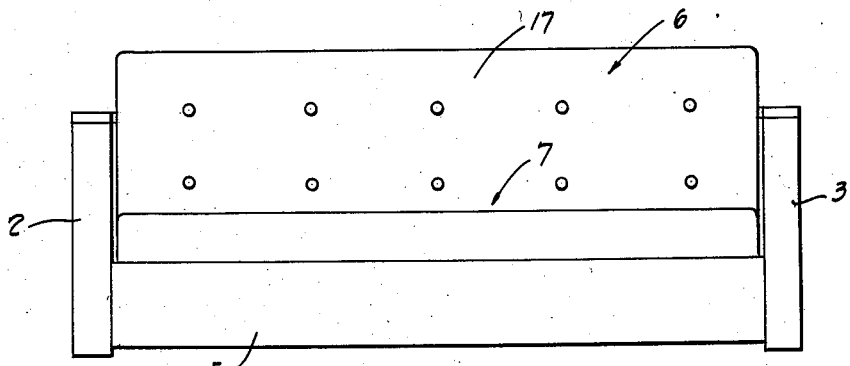
Figure 1 is a front view of the davenport-bed unit in its position as a davenport, the said view being fragmentary in some respects.

Referring now to the drawings, it will be seen that the convertible davenport-bed of this invention is generally comprised of a main frame designated 1, which is of substantially U-shaped configuration, including arm portions 2 and 3 at opposite ends, connected together and secured to a rear section 4. The forward ends of the respective sections 2 and 3 are connected and fastened to a front frame member 5, all of the respective parts being securely maintained in connection in accordance with conventional practice in the furniture industry.

Figure 2:
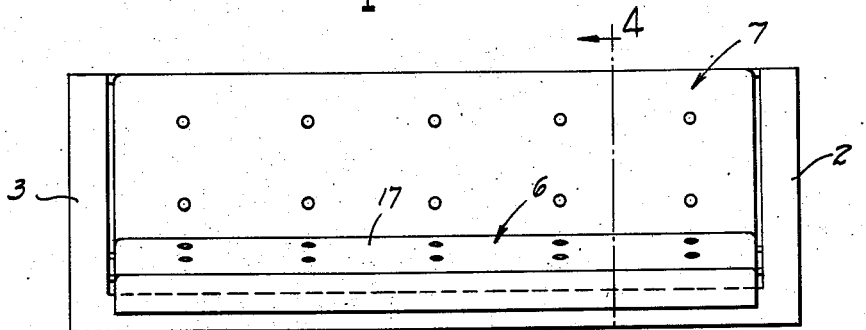
Figure 2 is a top view of the unit, shown in Figure 1.
Figure 4:
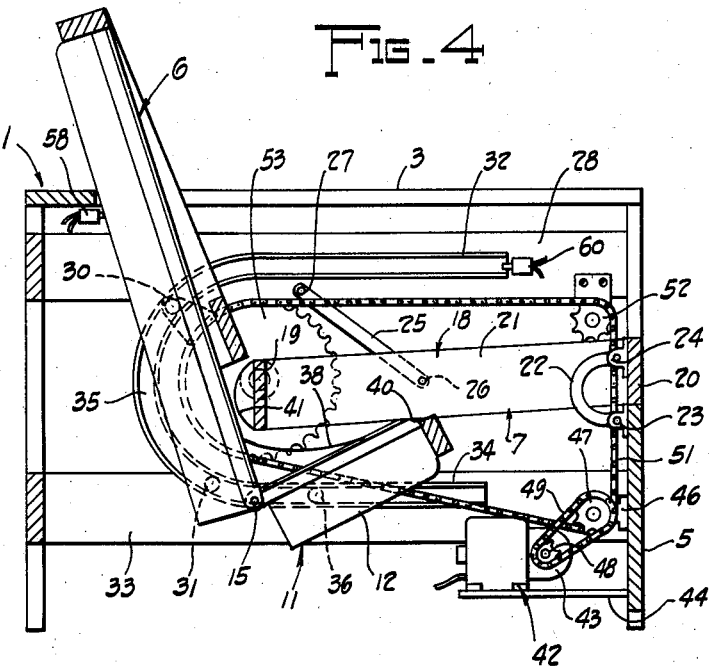
Figure 4 is a sectional view taken about on the line 4—4 of Figure 2 looking in the direction of the arrows, illustrating certain of the parts and provisions for converting the unit into a bed, the said unit being shown in its position as a davenport.

Referring particularly to Figures 4 to 8 inclusive, it will be seen that supported by the main frame 1 as described in more detail hereinafter are the back and bed unit generally designated 6 and the seat unit generally designated 7. In Figure 8 it will be noted that with the respective parts in locations as illustrated, the back and bed unit 6 comprises a substantially rectangular frame having the side rails 8 and 9, connected at their ends with a top rail 10. The back and bed unit further includes a lower hinged section generally designated 11, which comprises the side rail member 12 and the corresponding side rail member 13 at the opposite end, connected by means of the bottom rail 14. The hinged section 11 is secured for swinging action with relation to the section 6 previously described by means of the pivots 15 and 16 shown in Figures 4 and 8 at opposite ends of the rails 8 and 12 and 9 and 13, the said opposite ends being adjacent in this particular instance. While it should be understood that in this disclosure, the respective parts are largely comprised of wood as is usual in the construction of furniture, it will also be clear that the same may be readily formed of metal or other suitable material as circumstances demand. Further the back and bed unit 6 is generally rectangular in configuration, and is adapted to support therewithin the usual springs and a suitable mattress, when the article is in condition for use as a bed, suitable provision being made on the outer face so to speak as seen in Figure 4, for the securing thereto of padding in order to provide the necessary comfort as a back rest or back portion of the davenport, the said back portion being indicated at 17 in Figures 1 and 2.

Turning now to a consideration of the operating construction of the article, and dealing first with the construction of the seat portion or seat unit, it will be seen that as indicated in Figures 4 and 8, the said seat unit is designated 18, being of a substantially rigid nature and of rectangular configuration, including the rear rail 19, and the front rail 20, connected together at opposite ends by the side rails 21 and 22a. The seat unit as a whole will first be described as to its manner of mounting and support in the main frame 1, it being understood that while the details of support are shown in Figure 4 as being of one end, the mounting and contruction is similar at the other end, being generally indicated in Figure 8.

As shown in Figure 4, the seat unit frame 18, is supported at its forward end and at the front rail by means of an arcuately shaped lever 22, pivotally connected at 23 to the front frame part 5, and at 24 to the front rail 20. Intermediate the ends of the side rails 21 and 22a, a link 25 is shown as being pivotally connected at 26 at one end to the said side rail 21 in this instance, and at 27 to a stiffening member 28, which is part of arm member 3 as will be readily understood.

Figure 5:
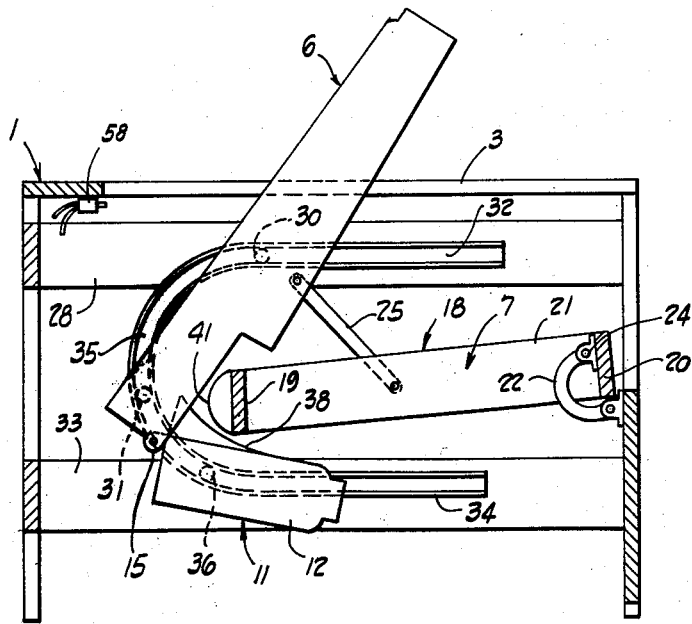
Figure 5 is a view similar to Figure 4 with the respective parts in intermediate position, during movement from the position as a davenport into its position as a bed.
Figure 7:
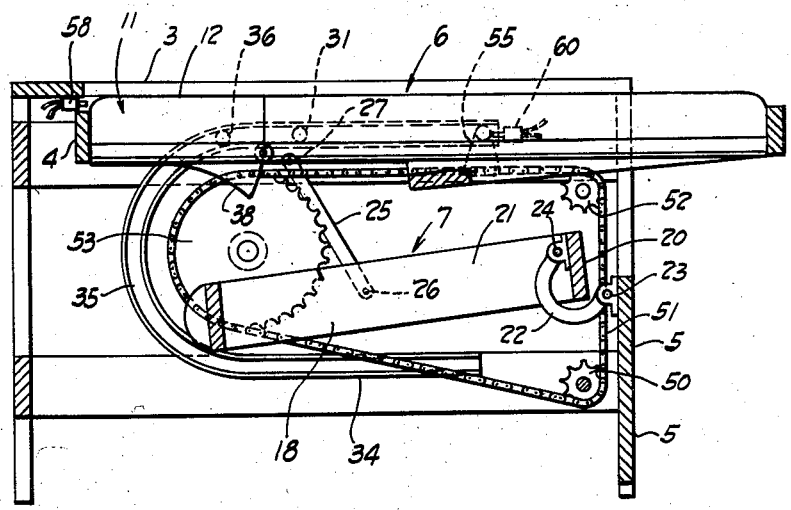
Figure 7 is a sectional view taken about on the line 7—7 of Fig. 3 looking in the direction of the arrows, showing the back and bed unit in position as a bed, the seat unit having moved into the position out of the path of such back and bed unit.

Referring particularly to Figures 4, 5, and 7, it will be seen that in Figure 4 the seat unit or seat frame 18, is in its upper forward position, in Figure 4 and in Figure 7 has been permitted by the operation of the back and bed unit to be subsequently described to move into the position shown in said figures whereby the arcuate link 22 permitted the seat unit in conjunction with the link 25 to move downwardly and rearwardly so to speak within the main frame.

Turning now to a consideration of the construction and mounting of the back and bed unit 6, again dealing with Figures 4 to 7 inclusive, it will be seen that this unit comprised as it is of the respective hinged sections, is provided at its ends with the offstanding or outwardly extending pin members 30 and 31, which members 30 and 31 are received by and within the channel 32, said channel 32 being supported on the stiffening member 28 at its upper portion and on a further stiffening member 33 for the lower section 34, the respective sections 32 and 34 being connected by an arcuate section 35, forming a continuous channel for purposes to be hereinafter described. The lower section of the back and bed unit 6, and denoted 11, is likewise equipped with suitable offstanding pin members 36, likewise received within the channel 32, 34, 35, the said lower section 11 being provided on each rail portion 12 and 13, with an arcuate surface such as indicated in Figure 4 at 38.

For the sake of clarity and simplicity, it will be noted that the back and bed unit 6 as shown in Figure 4, illustrates the respective sections, at substantially right angles, pivoted around the pivots 15 and 16, the said pins 30, 31, and 36, guiding and causing the respective parts to assume the position of that figure. In Figure 5 the said parts have moved into position somewhat forward or in an arcuate path from that shown in Figure 4, as the back and bed unit 6 moves into position to serve as a bed, illustrated in Figure 7 whereby the respective sections are straight, and thus any mattress and spring members which are carried thereby would likewise assume a straight position so as to properly support a person on the same as clearly illustrated in Figure 8.

It should be noted that the lower section 11, of the back and bed unit 6, is equipped with a suitable supporting portion such as indicated at 40 in Figure 4, which is adapted to abut with the lower edge of the rail 21 for example of the seat unit 18, so as to facilitate and cause the upward and forward movement or the reverse downward and rearward movement of the seat unit 18 as the back and bed unit 6 moves to or from the position shown in Figure 4 to the position shown in Figure 7 and Figure 8. Correspondingly the arcute formation of the air portions 12 and 13, indicated at 38 in each case, is adapted to abut with the rounded end formed on the extremity of each of the rails 21 and 22, and denoted 41 in Figure 4, and Figure 5, to thereby cause the movement of the seat unit 18 either from the position shown in Figure 8 to the position shown in Figure 4, or permit the reverse movement of the seat unit 18 as the back and bed unit 6 moves from the position shown in Figure 4 to that shown in Figure 8 for example.

Again bearing in mind that the structure hereinabove described in detail is duplicated at opposite ends and supported by and on the arm portions 2 and 3, it is now also seen that in order to effect operation of the back and bed unit 6 through the positions illustrated, motive power is necessary and for this means a suitable power device is provided, the said power device being generally designated 42, and including an electric motor and a worm gear speed reduction unit 43, the entire unit being suitably mounted and supported on the frame part 5 previously referred to as by means of a suitable bracket 44. At this point reference is made to Figure 9, which illustrates the manner of carrying the drive from the power unit 42 to the back and bed unit 6, and comprises a longitudinal shaft 45, suitably supported by the pillow blocks 46 in the several places, the said pillow blocks 46 being fastened to the front frame part 5 in any preferred manner. The shaft 45 is equipped with a suitable sprocket 47, adapted to be driven by a corresponding sprocket 48, through the means of a chain 49 to thus cause shaft 45 to revolve.

Figure 6:
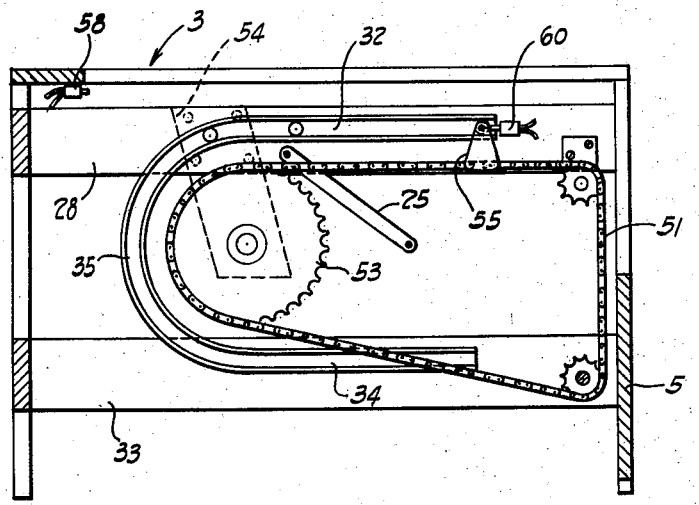
Figure 6 is a sectional view taken about on the line 6—6 of Figure 3 looking in the direction of the arrows, showing certain of the supporting means for the moveable parts of the unit.

At its opposite ends the shaft 45 is equipped with additional sprockets 50, which sprockets 50 are in turn adapted to engage chains 51, there being one provided at each of the arm portions 2 and 3. The chains 51 are in turn engaged near the upper portion of the forward part of the arm portions with additional sprockets 52, the sprocket 52 being mounted in any preferred manner on the stiffening members 28 provided. The chains 51 thence pass rearwardly over and engage with large sprocket wheels 53, the said sprocket wheels 53 being likewise carried by suitable brackets 54, more clearly shown in Figures 6 and 7 on the stiffening members 28. The chains 51 as will be readily understood are endless and intermediate their ends in each case are equipped with drive members such as illustrated in Figure 6 and denoted 55, which drive members are fastened in any preferred manner to the chain and likewise adapted to engage the offstanding pins 30 previously mentioned as being provided on the side rails 8 and 9 of the bed and back unit 6. It is pointed out that the member 55 as shown in Figure 6, is in the position so as to engage the pin 30 of the side rail 8, as shown in Figure 7, and it will also be clear that by suitable energization of the power device 42, motion of the respective chains 51 around the various sprockets supporting the same will be imparted. Assuming that the davenport-bed mechanism is in the condition as shown in Figure 7, energization of the motor may be effected and movement of the chains 51 caused in a counter-clockwise direction, to thereby impart through means of the connections 55 a rearward initial movement of the bed and back unit 6. Since the bed and back unit 6 must of necessity follow the path defined by the respective channels 32, 34, 35, it will thereby be understood that the parts will move through the positions shown in Figure 5 and thence to the positions shown in Figure 4. As the lower portion 11 of the back and bed unit moves into the condition shown in Figure 5, it will abut the frame 18 and thereby cause the said frame to move upwardly and forwardly into the position shown in Figure 4, to thereafter be supported by the part 40 of the respective side rails 12 and 13, abutting the lower edges of the corresponding side rails 21 and 22a of the frame 18. Thus the bed and back unit having moved into the position of Figure 4 may be used in conjunction with the seat unit 7 as a davenport.

In order to control the operation of the power device 42, a suitable switch arrangement is furnished, which is shown in diagrammatic detail in Figure 10, the respective parts being in their general relationship for operation as desired.

The switch unit of the controlling means is denoted 56, and in this instance is provided with a three position arrangement, whereby in the upper position of the switch arm 57, it will be assumed that operation of the motor 42 may be effected to cause the chains 51 to move in a counter-clockwise direction, the various parts having been initially for example in the position shown in Figure 7. When the switch unit is manipulated into the position as shown in Figure 10, the said chains 51 are caused to move, and thus the previous path described as being followed by the units 6 and 7 will be followed. The switch unit 56 is equipped with an intermediate or neutral position indicated in dotted lines in Figure 10 at A and the lower position indicated in dotted lines at B also in Figure 10 to cause the power unit to be rotated and to rotate the chains 51 in the clockwise direction so to speak.

Assuming as we have heretofore that the parts are in the condition shown in Figure 7, and the switch arm 57 is moved into the position shown in full lines in Figure 10, the bed and back unit 6 will thereby move into the position shown in Figure 4. When the rails 8 and 9 have assumed the position as shown in Figure 4, one of the said rails will strike a limit switch 58, which limit switch is in the circuit of the power means 42, to thereby interrupt the driving motion of such power means and cause the parts to remain in the condition shown in Figure 4. Since the worm gear device 43 is in effect a self-locking arrangement, and the connection of the same with the bed and back unit 6 by means of the chains 51 is a positive connection, no further movement of the respective parts can possibly take place once the power is interrupted to the power means 42 as will be readily clear.

Figure 3:
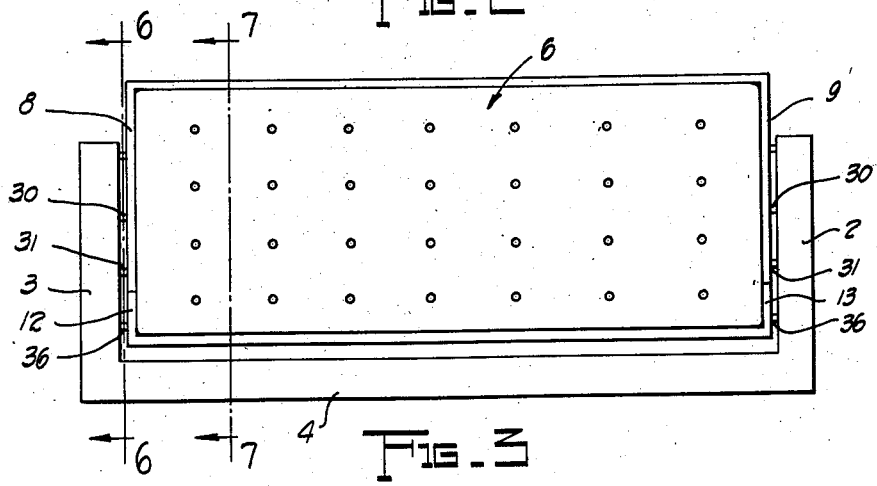
Figure 3 is a top plan view of the unit, the said unit having been converted into its position as a bed.

Assuming that from the condition of the parts now established and shown in Figure 4, it is desired to move the bed and back unit 6 into its position for occupancy as a bed, the switch arm 57 is thereby moved into the position shown by B in Figure 10, and thus the power unit 42 is energized to cause the chains 51 to move in the clockwise direction. Thereafter the parts pass through the position shown in Figure 5 and subsequently assume the position shown in Figure 7, with the bed and back unit in its uppermost location and suitable for use at this time. It should be pointed out here that the seat unit 7 does not in any way operate as a part of the bed and back unit, when the said davenport-bed is in the condition of Figure 7 for example, but is only used as a part of the unit when the davenport-bed is in the condition of the parts as shown in Figure 4. This is in contrast to previous types of convertible davenport-beds, and provides for the positioning of the bed and back unit 6 for use as a bed as shown and indicated in Figures 8 and 3 for example. It should also be noted that whereas certain of the views include the various cushions and mattress in their locations, other of the views omit such illustration for the sake of clarity and for an easier understanding of the entire device.

A further fact which might be pointed out is that the channels including the portions 32, 34, and 35, are in essence tracks which must be followed by the offstanding pins 30, 31, and 36 engaged therein, and that the chains 51 follow in their path substantially that of the respective channels so as to constantly maintain and drive through the connections 55 the said projections 30 through the respective positions.

When it is desired to convert the davenport into a bed, from the position shown in Figure 4 for example to that shown in Figures 7 and 8, the motor having been energized by movement of the switch in a manner previously described, the back and bed unit therefore moves and when it has reached the position of Figure 7, the offstanding pins 30 or one of them comes in contact with a limit switch 60, which limit switch 60 in turn interrupts the flow of current to the power device 42. Thereafter the respective parts are maintained in the condition of Figure 7 by reason of the interengagement of the offstanding members 30, 31, and 36 with the channel portion 32 and in addition are prevented from movement by the locking effect provided by the worm gear unit 43.

There has thus been provided a convertible davenport-bed article, which includes a bed and back unit, which is moveable from a position wherein a portion of the said unit serves as a back for the davenport, to a position above and substantially parallel with the seat unit provided, the said bed and back unit being equipped so as to support therewithin a suitable mattress or other padding which may be used as a bed. In addition the fact that the seat unit moves downwardly and inwardly out of the path of travel of the bed and back unit to the position for use as a bed, has been brought out, and furthermore when the entire unit is operated, power devices are provided for carrying out the movement of the said parts both to and from the positions shown in the various figures.

I claim:

1. In a convertible davenport of the class described, in combination, a main frame having arm sections, a first frame constituting a back and bed member, said member comprising a back in one position and a bed in another position, channel means mounted on said arm sections to support said first frame whilst in said positions and during movement thereto, said first frame having members inter-engaging said channel means, a second frame connected to said main frame movable independently of the first frame and main frame and comprising a seat, power means for moving said first frame member, endless drive means connected to said first frame and driven by the power means, and control elements for said power means to regulate movement thereby, the means for supporting said first frame including pin elements, and the channel means compelling the frame to follow a fixed path on the main frame when moved by the endless drive means from a rear and lower position wherein a portion of the frame is substantially vertical whilst in the position as a back, another portion extending forwardly and beneath the seat, to an upper position in which said entire first frame is substantially horizontal as a bed.

2. In a convertible davenport of the class described, in combination, a main frame having arm sections, a first frame constituting a back and bed member, said member comprising a back in one position and a bed in another position, channel means mounted on said arm sections to support said first frame whilst in said positions and during movement thereto, said first frame having members inter-engaging said channel means, a second frame connected to said main frame movable independently of the first frame and main frame and comprising a seat, power means for moving said first frame member, endless drive means connected to said first frame and driven by the power means, and control elements for said power means to regulate movement thereby, the second frame being supported on the main frame by links, one extending rearwardly and another substantially vertical, affording swinging movement for said frame, said first frame being independent of the second frame and including a fixed and a hinged portion adapted to engage said second frame to effect upward movement when said first frame is moved in one direction and permit downward movement when the first frame is moved in the other direction.

3. In a convertible davenport of the class described, in combination, a main frame including arm portions and a rear section connected therewith, a first unit comprising a back and bed frame, channel means on said arm portions to support said unit for movement to various positions, said first unit having parts engaging said channel means, said back and bed frame abutting said rear section in one position, a second unit comprising a seat and frame therefor, said seat frame being connected by swinging links to the main frame for rearward and downward and upward and forward movement, means on said first unit to engage and effect said last named movement, endless drive means connected to said first unit, power means carried by said main frame connected to said endless drive means to effect movement thereof, and control instrumentalities for regulating said power means to operate the same in either of opposite directions and including automatic means to stop the drive means at extreme of movements thereof, the means on the first unit to engage the second unit comprising a hinged section, said section at its ends being formed with arcuate portions for sliding contact with the frame of said second unit whereby to lift the latter upwardly.

References Cited in the file of this patent

UNITED STATES PATENTS

| | | |
|---|---|---|
| 814,921 | Saunders | Mar. 13, 1906 |
| 940,383 | Felton | Nov. 16, 1909 |
| 1,978,902 | Jackson | Oct. 30, 1934 |
| 2,534,177 | Lorenz et al. | Dec. 12, 1950 |
| 2,634,429 | Hopeman et al. | Apr. 14, 1953 |